United States Patent
Lin et al.

(10) Patent No.: US 10,618,065 B2
(45) Date of Patent: Apr. 14, 2020

(54) CONNECTING STRUCTURE FOR HANDHELD SHOWER AND WALL BASE

(71) Applicant: FUJIAN XIHE SANITARY WARE TECHNOLOGY CO., LTD, Nan'An, Fujian (CN)

(72) Inventors: Xiaofa Lin, Fujian province (CN); Xiaoshan Lin, Fujian province (CN); Qiqiao Liu, Fujian province (CN); Haibo Hong, Fujian province (CN); Caibo Gu, Fujian province (CN)

(73) Assignee: FUJIAN XIHE SANITARY WARE TECHNOLOGY CO., LTD, Fujian (CN)

( * ) Notice: Subject to any disclaimer, the term of this patent is extended or adjusted under 35 U.S.C. 154(b) by 0 days.

(21) Appl. No.: 16/028,853

(22) Filed: Jul. 6, 2018

(65) Prior Publication Data
US 2019/0083991 A1 Mar. 21, 2019

(30) Foreign Application Priority Data

Sep. 21, 2017 (CN) .................... 2017 2 1218075 U

(51) Int. Cl.
| *F16B 1/00* | (2006.01) |
| *B05B 1/18* | (2006.01) |
| *E03C 1/04* | (2006.01) |
| *B05B 15/65* | (2018.01) |
| *B05B 15/654* | (2018.01) |

(52) U.S. Cl.
CPC .............. *B05B 1/185* (2013.01); *B05B 15/65* (2018.02); *E03C 1/0408* (2013.01); *F16B 1/00* (2013.01); *B05B 1/18* (2013.01); *B05B 15/654* (2018.02); *F16B 2001/0035* (2013.01)

(58) Field of Classification Search
USPC ............................................................ 248/75
See application file for complete search history.

(56) References Cited

U.S. PATENT DOCUMENTS

| 6,594,832 | B2 * | 7/2003 | Yang ..................... A47K 3/28 239/283 |
| 7,360,723 | B2 * | 4/2008 | Lev ......................... B05B 1/16 239/442 |
| 9,828,752 | B2 * | 11/2017 | Genord ................... B05B 1/16 |
| 9,919,331 | B2 * | 3/2018 | Scheffer .................. E03C 1/06 |
| 10,046,341 | B2 * | 8/2018 | Wu ........................ B05B 1/185 |
| 2017/0259279 | A1 * | 9/2017 | Lin ........................ B05B 1/185 |
| 2018/0104707 | A1 * | 4/2018 | Lin ....................... B05B 1/1609 |

* cited by examiner

*Primary Examiner* — Monica E Millner
(74) *Attorney, Agent, or Firm* — Greenblum & Bernstein, P.L.C

(57) ABSTRACT

There is provided a connecting structure for a handheld shower and a wall base in this disclosure, which includes a shower provided with a first magnetic member and a wall base provided with a second magnetic member, all or a part of the first magnetic member magnetically mating with and attracting a corresponding second magnetic member in the wall base to position the shower on the wall base, and the shower being rotatable by a predetermined angle to drive a first magnetic member in the shower to form magnetic repulsion against the corresponding second magnetic member in the wall base.

13 Claims, 7 Drawing Sheets

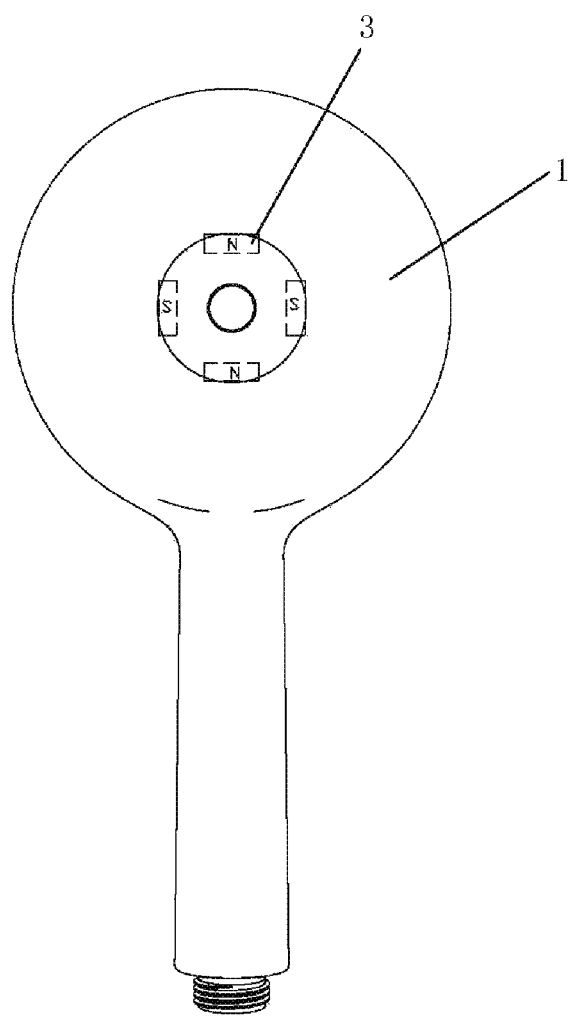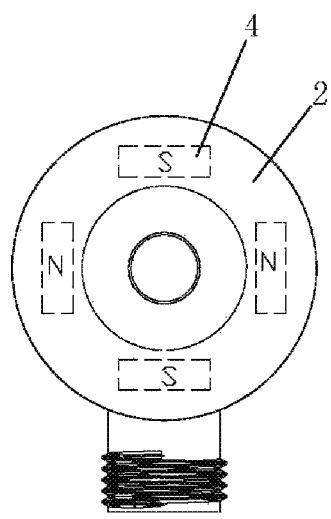
FIG. 7
FIG. 8

US 10,618,065 B2

CONNECTING STRUCTURE FOR HANDHELD SHOWER AND WALL BASE

CROSS-REFERENCE TO RELATED APPLICATION

The present application is based upon and claims the benefit of priority of Chinese Utility Model Application No. 201721218075.2, filed on Sep. 21, 2017, the entire content of which is incorporated herein by reference.

TECHNICAL FIELD

This disclosure relates to a tool for showering, in particular, a connecting structure for a handheld shower and a wall base.

BACKGROUND

When a handheld shower is not used or when there is a need to fix the shower, usually, the shower is to be fixed by inserting the handle of the shower to a wall base. The handle of the shower can be taken off the wall base to be moved at will, which is very convenient. But it could not meet the need of specific consumers since its monotonous structure. And a new handheld shower appeared then which could connect to the wall base by magnetism. However, the magnetic shower needs to be taken off by overcoming the attractive force of magnets vigorously. Some may be taken off by rotating the shower to a nonmagnetic zone, which still cannot realize automatic separation and cannot achieve the effect of effort-saving.

SUMMARY

This disclosure provides a connecting structure for a handheld shower and a wall base which can at least alleviate the defects in the magnetic connection for the handheld shower and the wall base of the prior art.

The technical solution of this disclosure for solving the technical problem includes: a connecting structure for a handheld shower and a wall base, comprising a shower provided with a first magnetic member and a wall base provided with a second magnetic member, all or part of the first magnetic member magnetically mating with and attracting a corresponding second magnetic member in the wall base to position the shower on the wall base, and the shower being rotatable at a predetermined angle to drive a first magnetic member in the shower to form magnetic repulsion against the corresponding second magnetic member in the wall base.

This disclosure is further described with reference to the drawings and embodiments. Nonetheless, the connecting structure for the handheld shower and the wall base according to this disclosure is not limited to the embodiments.

BRIEF DESCRIPTION OF THE DRAWINGS

FIG. 7 is a distribution diagram of first magnetic members in the shower of this disclosure.

FIG. 8 is a distribution diagram of second magnetic members in the wall base of this disclosure.

EMBODIMENTS

Figure 1:
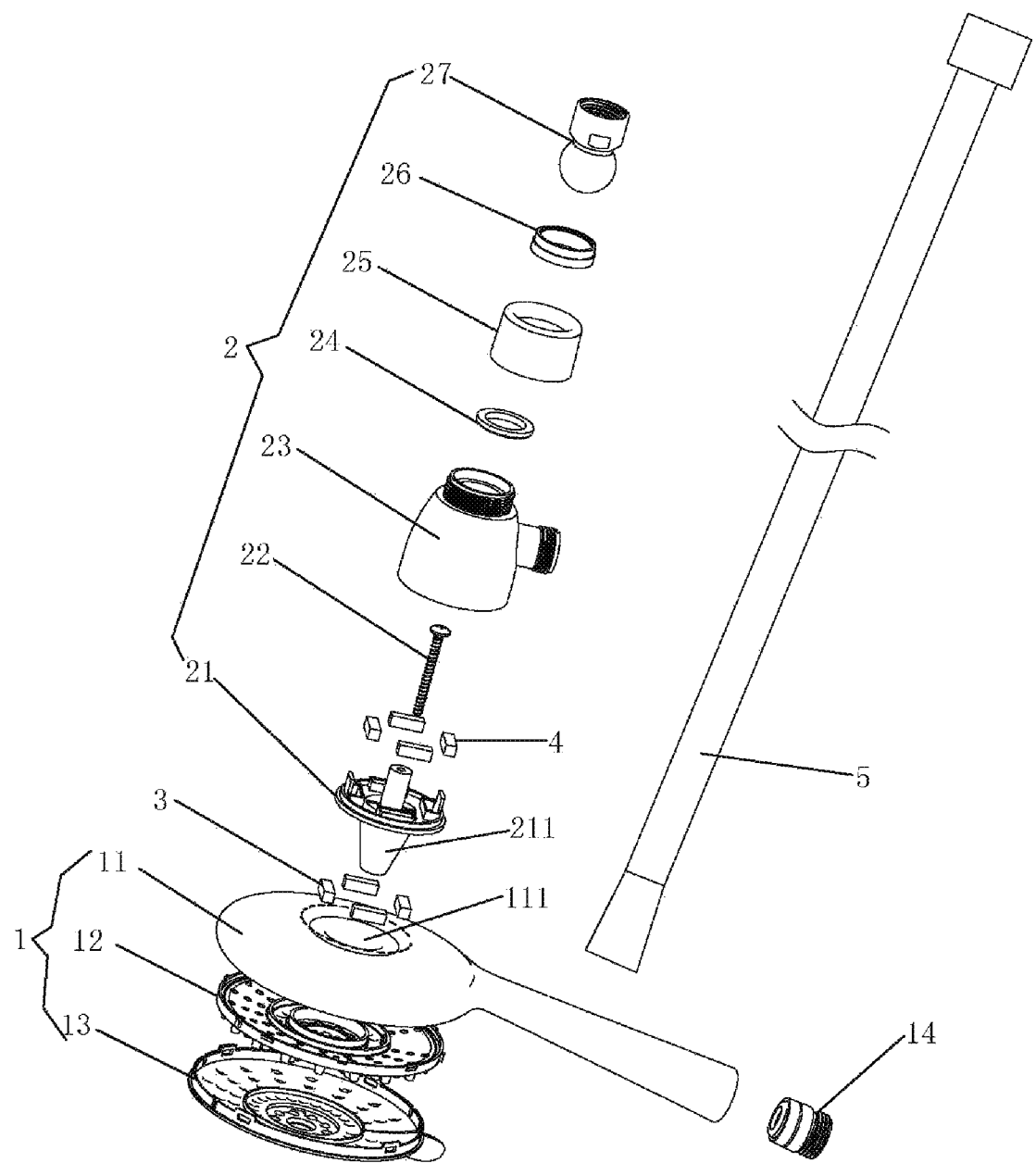
FIG. 1 is a disassemble diagram of a shower, a wall base and a hose of this disclosure.
Figure 2:
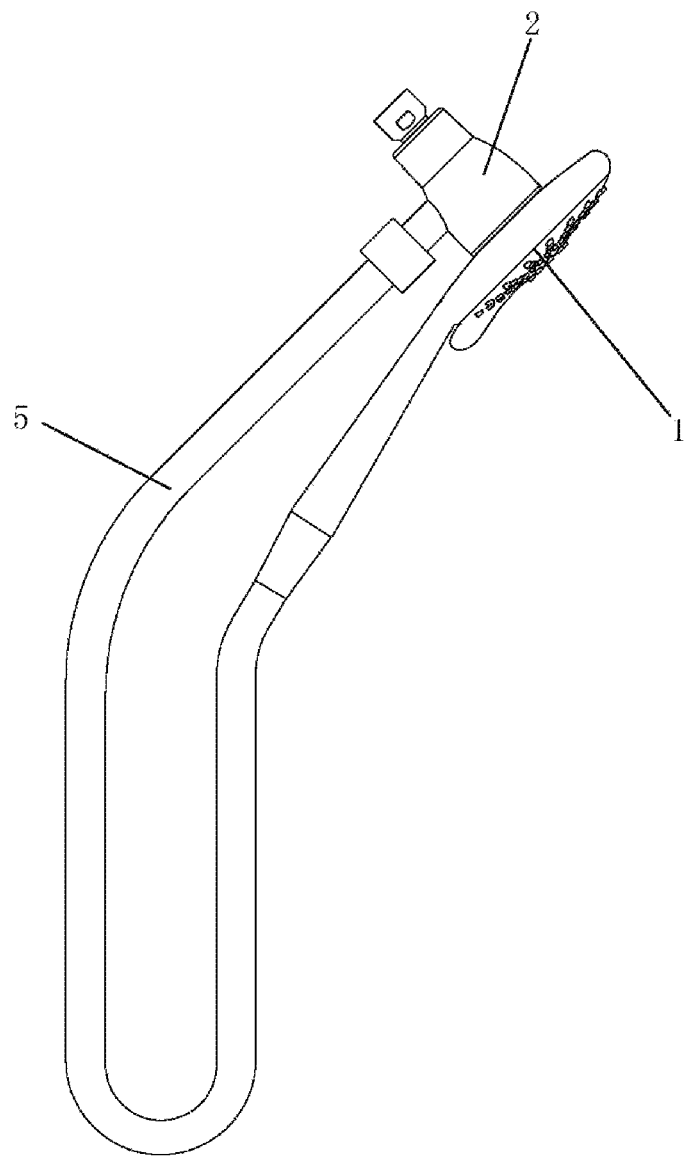
FIG. 2 is an overall structure diagram of the shower, the wall base and the hose of this disclosure.
Figure 3:
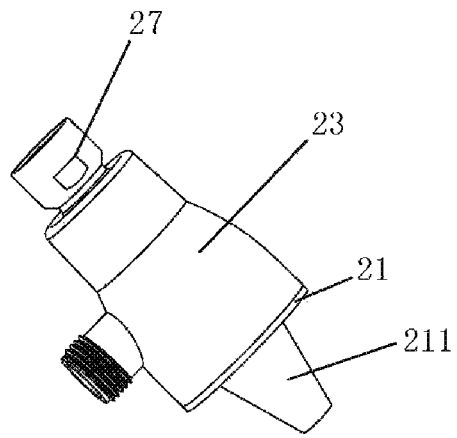
FIG. 3 is a structure diagram of the wall base of this disclosure.
Figure 4:
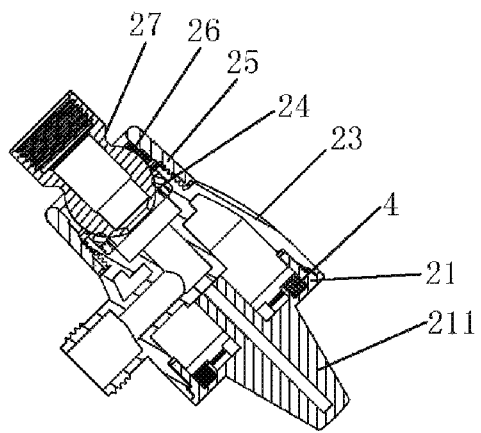
FIG. 4 is a schematic cross-section view of the wall base of this disclosure.
Figure 5:
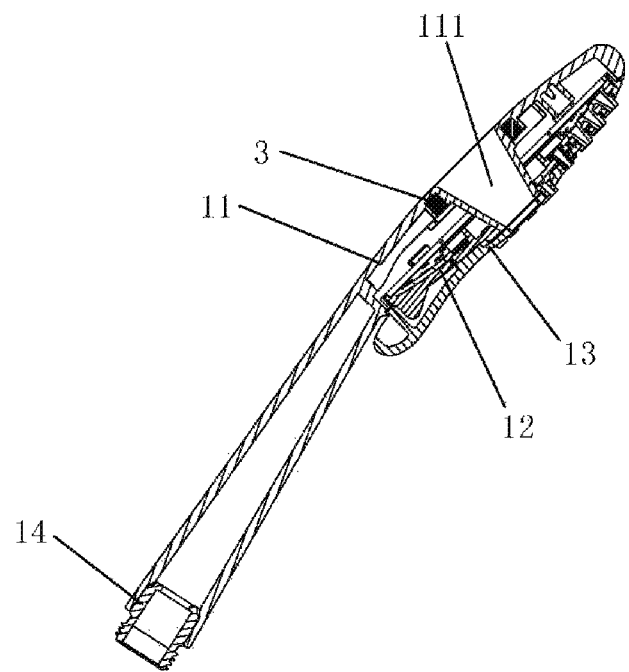
FIG. 5 is a schematic cross-section view of the shower of this disclosure.
Figure 6:
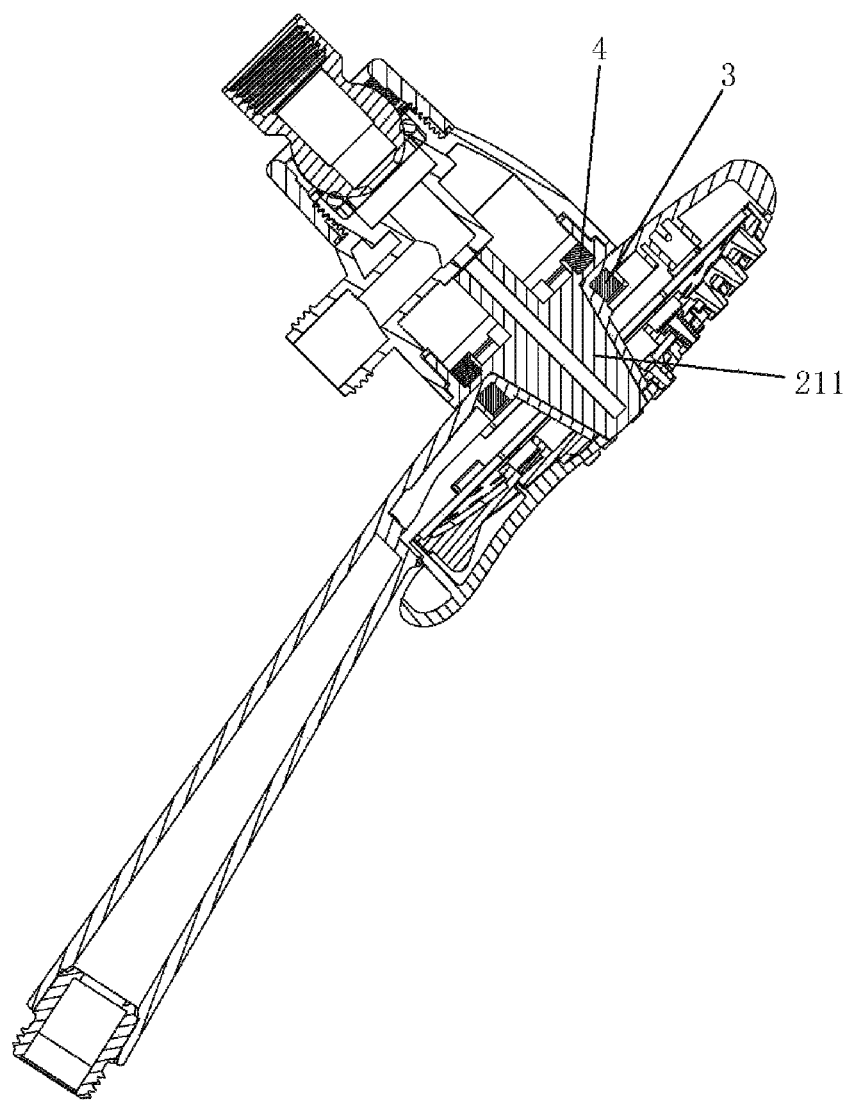
FIG. 6 is a schematic cross-section view of the wall base and the shower in an attracted state.

Referring to FIGS. 1-10, a connecting structure for a handheld shower and a wall base of this disclosure comprises a shower 1 provided with first magnetic members 3 and a wall base 2 provided with second magnetic members 4. All or part of the first magnetic members 3 magnetically mates with corresponding second magnetic members 4 in the wall base 2 to position the shower 1 on the wall base 2. The shower 1 is rotatable by a predetermined angle to drive first magnetic members in the shower 1 to form magnetic repulsion against the corresponding second magnetic members in the wall base 2.

In this embodiment, the number of the first magnetic members 3 and the number of the second magnetic members 4 are the same even number. The first magnetic members 3 and the second magnetic members 4 are evenly distributed in a circumferential direction of the parts where they are arranged respectively. Each first magnetic member 3 has an outward magnetic pole that has a reverse polarity relative to an outward magnetic pole of an adjacent first magnetic member 3 in the circumferential direction. The outward magnetic pole of the first magnetic member 3 is the magnetic pole for magnetically mating with the second magnetic member 4. Each second magnetic member 4 has an outward magnetic pole has a reverse polarity relative to an outward magnetic pole of an adjacent second magnetic member 4 in the circumferential direction. The outward magnetic pole of the second magnetic member 4 is the magnetic pole for magnetically mating with the first magnetic member 3.

In this embodiment, the shower 1 and the wall base 2 further cooperate with a separating positioning structure. The positioning structure does not restrict the rotation of the shower 1 with regard to the wall base 2. The positioning structure includes a positioning groove 111 provided in the shower 1 and a positioning portion 211 provided on the wall base 2. The positioning groove 111 and the positioning portion 211 are engaged by insertion. An outer contour of the cross-section of the positioning groove 111 and the positioning portion 211 are circular. Specifically, the positioning groove 111 and the positioning portion 211 are both in form of a circular truncated cone.

In this embodiment, the shower 1 comprises a shower body 11 and a face covering assembly that are connected with each other. The face covering assembly is formed by a watering face cover 12 and a decorating face cover 13. The shower body 11 at a water intake end is connected with a water supply connection 14. The positioning groove 111 is provided at a head portion of the shower body 11. The even magnetic members 3 are provided in the head portion of the shower body 11 and fit to an outer periphery of the positioning groove 111.

In this embodiment, the wall base 2 comprises a wall base body 23, a support 21 and a ball socket 27. The support 21 is locked to one end of the wall base body 23 by a screw 22 and is provided with the even second magnetic members 4 and the positioning portion 211. The ball socket 27 is mounted on the other end of the wall base body 23 by a nut cap 25 mating with a bushing 26 and a gasket 24. The wall base 2 is provided with a water passage. The water passage connects to the water intake end of shower 1 by means of a hose 5. Specifically, the water passage is provided in the wall base body 23 of the wall base 2. The ball socket 27 allows water to enter and connects to the water passage.

In this embodiment, both the number of the first magnetic members 3 and the number of the second magnetic members 4 are four. The distribution of the four first magnetic members 3 is shown in FIG. 7. The outward magnetic poles of the four first magnetic members 3 are N-pole, S-pole, N-pole and S-pole, respectively. The distribution of the four second magnetic members 4 is shown in FIG. 8. The outward magnetic poles of the four second magnetic members 4 are S-pole, N-pole, S-pole and N-pole, respectively.

Figure 9:
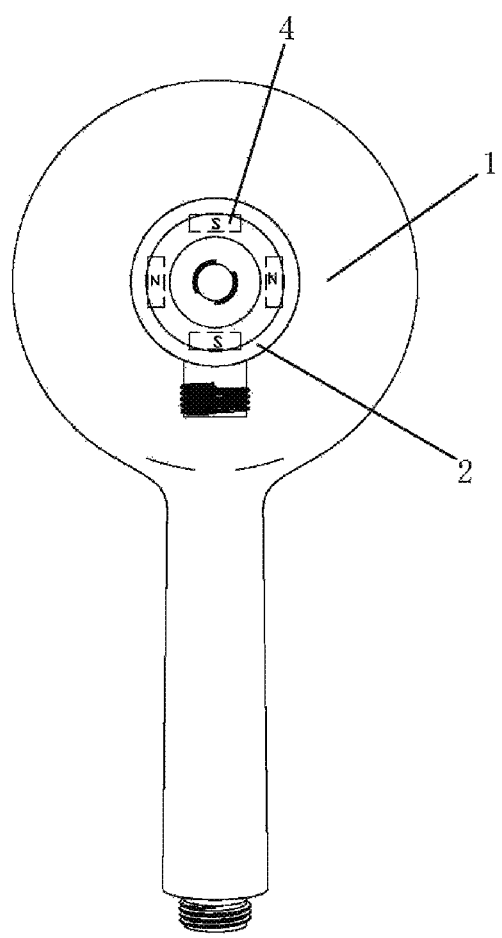
FIG. 9 is a diagram of a connected state of the shower and the wall base of this disclosure.
Figure 10:
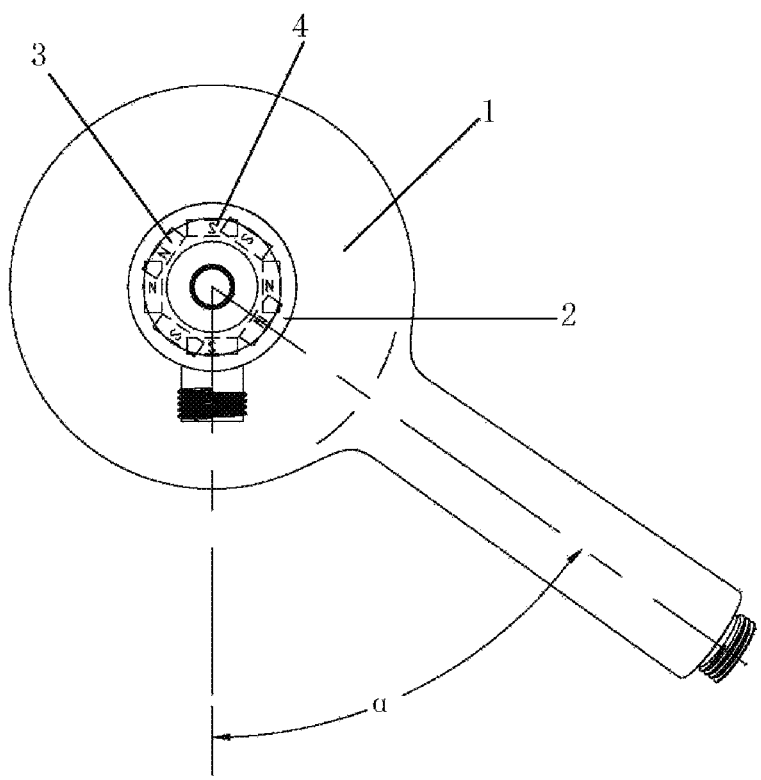
FIG. 10 is a diagram of a state where the shower of this disclosure rotates a predetermined angle.

To position the shower 1 on the wall base 2, firstly, the shower 1 is moved towards the wall base 2 to engage the positioning groove 111 with the positioning portion 211 so the shower 1 is positioned on the wall base 2 preliminarily; and then the four first magnetic members 3 cooperate magnetically with the corresponding second magnetic members 4 to realize precise positioning. That is, the outward magnetic poles of the four first magnetic members have reverse polarity relative to the outward magnetic poles of the four second magnetic members 4 to generate magnetic attraction, as shown in FIG. 9. The shower 1 can be taken off by rotating the shower 1 a certain angle counterclockwise (or clockwise) (the angle α shown in FIG. 10 is about 45°) so that the shower 1 drives each first magnetic member 3 to rotate till the outward magnetic pole of the first magnetic member 3 is displaced from the corresponding outward magnetic pole of the second magnetic member 4 and moves toward the next adjacent outward magnetic pole of the second magnetic member 4. As shown in FIG. 10, at this time, as the magnetic poles have the same polarity, a repulsive force is generated to urge the shower 1 to automatically separate from the wall base 2, thereby achieving the effect of effort-saving.

The number of the first magnetic members and the number of the second magnetic members are not limited to an even number and can be different from each other. For example, the number of the first magnetic members and the number of the second magnetic members can be in a multiple relationship such that by providing a reasonable distribution of the magnet poles of the first magnetic members and the second magnetic members, the shower can be positioned by means of magnetic attractive force and the shower can be rotated to produce a repulsive force so as to urge the shower to automatically separate from the wall base, thereby achieving the effect of effort-saving.

As compared to the prior arts, this disclosure has the following advantageous effects.

1. The arrangement of the first and the second magnetic members makes it possible that not only the shower can be positioned in the wall base by magnetic attraction, but when there is a need to take off the shower, one merely needs to rotate the shower so that a magnetic repulsive force is produced between the first magnetic member in the shower and the corresponding second magnetic member in the wall base, which urges the shower to automatically separate from the wall base, thereby achieving the effect of effort-saving.

2. The arrangement of the positioning structure makes it possible to perform preliminary positioning of the shower. After that, precise positioning of the shower is performed by means of magnetic attraction between the first magnetic member and the second magnetic member, which is very convenient.

The above embodiment is described to further explain a connecting structure for the handheld shower and the wall base of this disclosure. However, this disclosure is not limited to the foresaid embodiment. It is intended that any simple modification, equivalent change and variation made to the foresaid embodiment according to the technical essence of this disclosure falls within the protection scope of this disclosure.

What is claimed is:

1. A connecting structure for a handheld shower and a wall base, comprising:
    a first magnetic member provided in the handheld shower; and
    a second magnetic member provided in the wall base,
    wherein all or a part of the first magnetic member magnetically mates with and attracts all or a part of the second magnetic member in the wall base to position the handheld shower on the wall base, and
    wherein the handheld shower is rotatable by a predetermined angle to drive the first magnetic member in the handheld shower into magnetic repulsion against the second magnetic member in the wall base.

2. The connecting structure for the handheld shower and the wall base according to claim 1, wherein the number of the first magnetic member and the number of the second magnetic member are at least two, respectively, and the first magnetic members are distributed in a circumferential direction of the handheld shower, and the second magnetic members are distributed in a circumferential direction of the wall base.

3. The connecting structure for the handheld shower and the wall base according to claim 2, wherein the number of the first magnetic member and the number of the second magnetic member are the same even number, each first magnetic member has an outward magnetic pole that has a reverse polarity relative to an outward magnetic pole of an adjacent first magnetic member in the circumferential direction, and each second magnetic member has an outward magnetic pole that has a reverse polarity relative to an outward magnetic pole of an adjacent second magnetic member in the circumferential direction.

4. The connecting structure for the handheld shower and the wall base according to claim 1, wherein the handheld shower and the wall base further cooperate with a separating positioning structure that does not restrict a rotation of the handheld shower with regard to the wall base, whereby the magnetic repulsion is driven between the first magnetic member and the second magnetic member.

5. The connecting structure for the handheld shower and the wall base according to claim 4, wherein the positioning structure comprises a positioning groove provided in the handheld shower and a positioning portion provided on the wall base, the positioning groove and the positioning portion being engaged by insertion, an outer contour of a cross-section of the positioning groove and the positioning portion are circular.

6. The connecting structure for the handheld shower and the wall base according to claim 4, wherein the positioning groove and the positioning portion are both in form of a circular cone or a circular truncated cone.

7. The connecting structure for the handheld shower and the wall base according to claim 4, wherein the handheld shower comprises a shower body and a face covering assembly that are connected with each other, the positioning groove and the first magnetic member being provided in a head portion of the shower body.

8. The connecting structure for the handheld shower and the wall base according to claim 4, wherein the wall base comprises a wall base body and a support connected to the wall base body, the wall base being provided with the second magnetic member and the positioning portion.

9. The connecting structure for the handheld shower and the wall base according to claim 8, wherein the wall base is provided with a water passage that connects to a water intake end of the handheld shower by a hose; the water passage is provided in the wall base body of the wall base, the wall base body is further provided with a ball socket that allows water to enter, and ball socket connects to the water passage.

10. The connecting structure for the handheld shower and the wall base according to claim 1, wherein the wall base is provided with a water passage that connects to a water intake end of the handheld shower by a hose.

11. A tool for showering comprising
a handheld shower;
a wall base; and
a connecting structure for the handheld shower and the wall base,
wherein the connecting structure comprises:
at least one first magnetic member provided in the handheld shower; and
at least one second magnetic member provided in the wall base,
wherein all or a part of the at least one first magnetic member magnetically mates with and attracts all or a part of the at least one second magnetic member in the wall base to position the handheld shower on the wall base, and
wherein the handheld shower is rotatable by a predetermined angle to drive the at least one first magnetic member in the handheld shower into magnetic repulsion against the at least one second magnetic member in the wall base.

12. The tool for showering according to claim 11, wherein the at least one first magnetic member comprises a plurality of first magnetic members and the at least one second magnetic member comprises a plurality of second magnetic members, and the plurality of first magnetic members are distributed in a circumferential direction of the handheld shower, and the plurality of second magnetic members are distributed in a circumferential direction of the wall base.

13. The tool for showering according to claim 12, wherein a number of the plurality of first magnetic members and a number of the plurality of second magnetic members is a same even number, each first magnetic member has an outward magnetic pole that has a reverse polarity relative to an outward magnetic pole of an adjacent first magnetic member in the circumferential direction, and each second magnetic member has an outward magnetic pole that has a reverse polarity relative to an outward magnetic pole of an adjacent second magnetic member in the circumferential direction.

* * * * *